(No Model.)

W. H. HOWE.
WATERING APPARATUS FOR HOT HOUSES.

No. 293,577. Patented Feb. 12, 1884.

WITNESSES:
Thos. Houghton.
W. Read.

INVENTOR:
W. H. Howe
BY Munn
ATTORNEYS.

UNITED STATES PATENT OFFICE.

WARREN H. HOWE, OF MARLBOROUGH, MASSACHUSETTS.

WATERING APPARATUS FOR HOT-HOUSES.

SPECIFICATION forming part of Letters Patent No. 293,577, dated February 12, 1884.

Application filed February 26, 1883. (No model.)

*To all whom it may concern:*

Be it known that I, WARREN H. HOWE, of Marlborough, in the county of Middlesex and State of Massachusetts, have invented a new and Improved Watering Apparatus for Hot-Houses, of which the following is a full, clear, and exact description.

My invention consists of a system of perforated pipes arranged in suitably elevated positions in the hot-house, and connected with an elevated water-tank, a pump, or other source for distributing water and sprinkling the ground and the plants in a simple, efficient, and labor-saving way, by opening the cocks to the distributing-pipes where and when it may be required.

Reference is to be had to the accompanying drawings, forming part of this specification, in which similar letters of reference indicate corresponding parts in both the figures.

Figure 1:
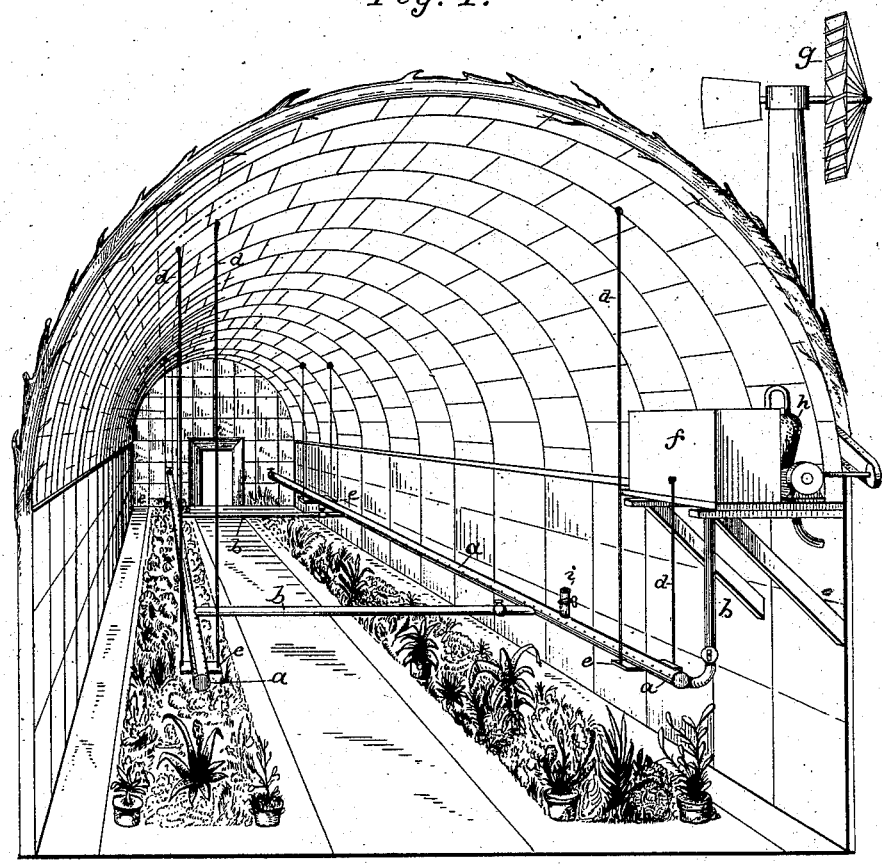
Figure 2:
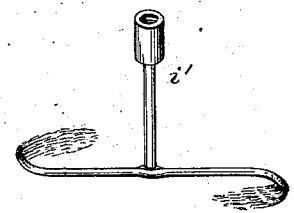

Figure 1 is a perspective view of a portion of a hot-house, with pipes contrived for sprinkling the ground and for neutralizing the heat of the sun by the generated vapor, by fine jets of water issuing from pipes perforated with fine holes by the pressure of an elevated tank or a pump. Fig. 2 represents a rotary jet device that may be employed instead of the perforated pipes.

For economy of labor in sprinkling the plants and moistening the ground in hot or green houses and hot-beds covered with glass, and also for distributing the water more evenly and in finer jets and less injuriously to the plants than it can be done by the hose in the common way, I propose to employ sprinkling-pipes *a*, in suitable arrangement, throughout the building or hot-beds of glass, for covering the whole space properly, by suspending said pipes a few feet above the ground or benches or beds, the pipes being finely perforated—say at the sides, or well toward the top—so that the jets will project laterally to the extent of the range of the ground they are to cover when the water is high in the tank, and will diminish gradually in extent of spread as the water falls or is partially turned off by the cocks, so as to fall on the whole surface alike, to which pipes the water will be conducted from the tank by any approved system of supply-pipes, *b*, which will be branched and fitted with cocks to control the distribution of the water, as may be desired; but finer holes may be arranged to sprinkle the whole surface at once. The pipes may be suspended by hangers of rods *d* and plates *e*, or by any approved contrivance.

For supplying the water to the elevator-tank *f*, from which the distributing-pipes are to be supplied, I propose to employ a wind-mill, *g*, to work a pump, *h*, for pumping up the water; but of course other power may be employed when available; or the water may be fed to the perforated pipes directly from a pump, as desired. In some cases it may be preferred to employ rotary jet sprinklers *i*, instead of the perforated pipes, the sprinklers being distributed throughout the space to be covered suitably for the purpose. Strainers will be employed to prevent the perforations from fouling by any matters floating in the water, and suitable plugs and caps will be fitted in the pipes, for opening them to wash and otherwise clean them out, when required.

Having thus fully described my invention, I claim as new and desire to secure by Letters Patent—

The improved sprinkling apparatus for hot-houses, consisting of a system of distributing perforated pipes suitably suspended in the house, and an elevated supply tank or pump, and connecting-pipes, branches, and regulating-cocks, contrived for the supply and distribution of the water, for regulating the moisture and temperature of the air, substantially as described.

WARREN H. HOWE.

Witnesses:
EDWARD F. JOHNSON,
WILLIAM N. DAVENPORT.